(12) United States Patent
Miyake et al.

(10) Patent No.: US 6,855,457 B2
(45) Date of Patent: Feb. 15, 2005

(54) NONAQUEOUS ELECTROLYTE SECONDARY BATTERY WITH A MOLTEN SALT ELECTROLYTE

(75) Inventors: Masahide Miyake, Kobe (JP); Masahisa Fujimoto, Osaka (JP); Hideyuki Koga, Kobe (JP); Hisaki Tarui, Kobe (JP); Shin Fujitani, Kobe (JP); Yoshinori Kida, Kobe (JP)

(73) Assignee: Sanyo Electric Co., Ltd., Osaka (JP)

( * ) Notice: Subject to any disclaimer, the term of this patent is extended or adjusted under 35 U.S.C. 154(b) by 11 days.

(21) Appl. No.: 10/281,172

(22) Filed: Oct. 28, 2002

(65) Prior Publication Data

US 2003/0096163 A1 May 22, 2003

(30) Foreign Application Priority Data

Oct. 29, 2001 (JP) .......................... 2001-330288
Oct. 15, 2002 (JP) .......................... 2002-300732

(51) Int. Cl.$^7$ ............................................. H01M 10/08
(52) U.S. Cl. ........................ 429/188; 429/203; 429/339; 429/231.8; 252/62.2
(58) Field of Search ................. 429/188, 189, 429/201, 330; 252/62.2

(56) References Cited

U.S. PATENT DOCUMENTS

| 4,442,187 A | | 4/1984 | MacDiarmid et al. ....... 429/213 |
| 4,707,423 A | * | 11/1987 | Kalnin et al. ............... 429/112 |
| 5,446,134 A | * | 8/1995 | Armand et al. ............. 534/558 |
| 5,652,072 A | * | 7/1997 | Lamanna et al. ........... 429/307 |
| 5,691,081 A | * | 11/1997 | Krause et al. .............. 429/307 |
| 6,063,522 A | * | 5/2000 | Hamrock et al. ........... 429/200 |
| 6,294,289 B1 | * | 9/2001 | Fanta et al. ................. 429/188 |
| 6,296,973 B1 | * | 10/2001 | Michot et al. .............. 429/300 |
| 6,326,104 B1 | * | 12/2001 | Caja et al. .................. 429/188 |
| 6,544,691 B1 | * | 4/2003 | Guidotti ...................... 429/344 |

FOREIGN PATENT DOCUMENTS

| JP | 05-159773 A | 6/1993 |
| JP | 09-120816 A | 5/1997 |
| JP | 11-097069 A | 4/1999 |
| JP | 2000-077100 A | 3/2000 |

OTHER PUBLICATIONS

Boehm, H.P., et al.; "Graphite Salts with Perfluoroalkanesulfonic Acids and Alkanesulfonic Acids"; *Synthetic Metals*, 23; pp. 395–400; 1988.

Zhang, Xuerong, et al.; "Graphite Intercalation of Bis(trifluoromethanesulfonyl) Imide and Other Anions with Perfluoroalkanesulfonyl Substituents"; *Materials Research Bulletin*; vol. 34, No. 3, pp. 363–372; 1999.

Zhang, X., et al.; "Graphite Intercalation with Perfluoroalkylsulfonates, and Perfluoroalkylsulfonyl Imides and Methide"; *Mol. Cryst. and Liq. Cryst.*; vol. 340, pp. 37–42; 2000.

* cited by examiner

*Primary Examiner*—Mark Ruthkosky
(74) *Attorney, Agent, or Firm*—Kubovcik & Kubocik

(57) ABSTRACT

A non aqueous electrolyte secondary battery comprises a positive electrode made from a material which is capable of occluding and discharging anions, a negative electrode made from a material which is capable of occluding and discharging cations, and a non aqueous electrolyte containing a room temperature molten salt having a melting point of not greater than 60° C.

18 Claims, 5 Drawing Sheets

Electrical Potential of Positive Electrode
(V vs. Li/Li+)

Electrical Potential of Negative Electrode
(V vs. Li/Li+)

NONAQUEOUS ELECTROLYTE SECONDARY BATTERY WITH A MOLTEN SALT ELECTROLYTE

FIELD OF THE INVENTION

The present invention relates to a non aqueous electrolyte secondary battery. Especially, the invention is characterized as an improvement in a non aqueous electrolyte which makes it possible to inhibit decomposition of the electrolyte and increase fire retardancy of the battery.

BACKGROUND OF THE INVENTION

A non aqueous electrolyte secondary battery having high electromotive force in which there is a non aqueous electrolyte and lithium ions transfer between a positive electrode and a negative electrode has recently been utilized as a new type high output and high energy secondary battery.

In such a non aqueous electrolyte secondary battery, a lithium transition metal composite oxide such as $LiCoO_2$ has been used as the positive electrode, a carbon material which is capable of occluding and discharging lithium metal, a lithium alloy or lithium has been used as the negative electrode, and an organic solvent, such as ethylene carbonate and diethyl carbonate, which dissolves a solute comprising a lithium salt such as $LiBF_4$ and $LiPF_6$, has been used as the non aqueous electrolyte.

However, in such non aqueous electrolyte secondary battery in which charging and discharging takes place by movement of lithium ions between the positive and negative electrodes, the organic solvent of the non aqueous electrolyte is reduced in capacity by decomposition, and the organic solvent is combustible and there is a risk of the battery burning when the battery is under an unusual condition, for example, excessive charge.

OBJECT OF THE INVENTION

An object of the present invention is to solve the above-described problems of a non aqueous electrolyte secondary battery. It is an object to provide a non aqueous electrolyte secondary battery having excellent fire retardancy by improvement of a non aqueous electrolyte to inhibit decomposition of the non aqueous electrolyte and reduce a decrease in capacity.

SUMMARY OF THE INVENTION

To solve the above-described problems, a non aqueous electrolyte secondary battery of the present invention includes a positive electrode comprising a material which is capable of occluding and releasing anions, a negative electrode comprising a material which is capable of occluding and releasing cations, and a non aqueous electrolyte containing a room temperature molten salt having a melting point of not greater than 60° C.

EXPLANATION OF ELEMENTS

Figure 1:
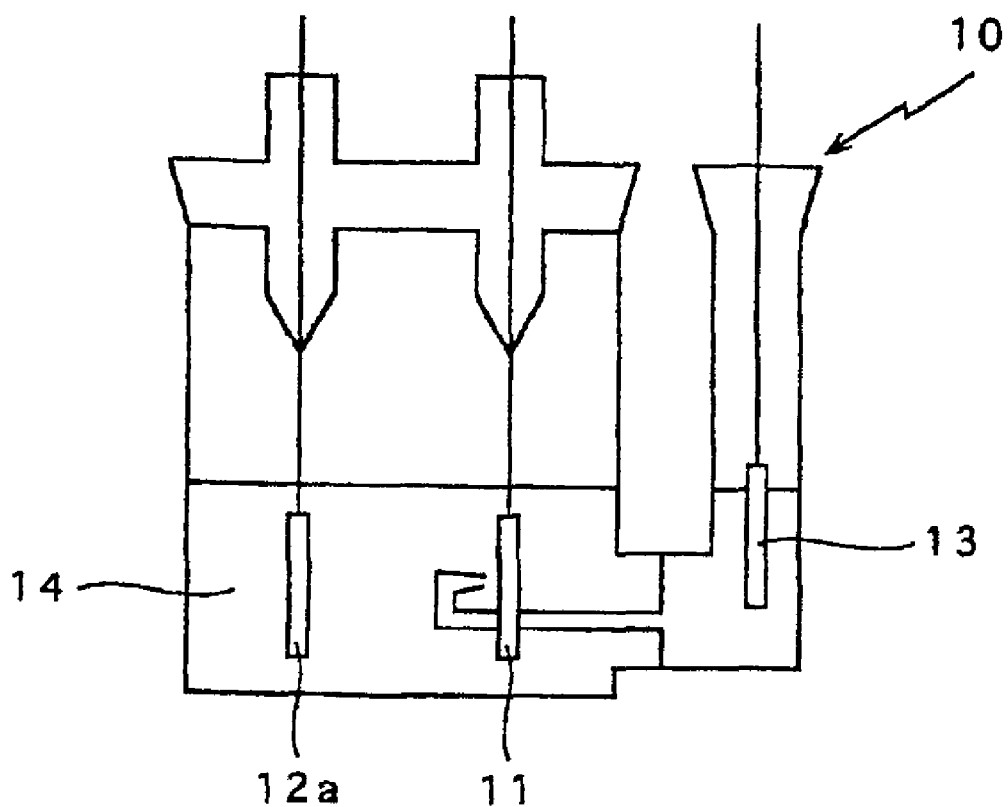
FIG. 1 is a drawing illustrating a test cell prepared in Example 1.

10: cell container
11: positive electrode
12: negative electrode
13: reference electrode
14: non aqueous electrolyte

DETAILED EXPLANATION OF THE INVENTION

In a non aqueous electrolyte secondary battery of the present invention, anions are occluded and discharged at the positive electrode, and cations are occluded and discharged at the negative electrode during charging and discharging of the battery.

When anions are occluded and discharged at the positive electrode, although electrical potential increases, the non aqueous electrolyte is not decomposed like a conventional non aqueous electrolyte comprising an organic solvent because the electrolyte includes a room temperature molten salt having a melting point of not greater than 60° C. to prevent loss of capacity and provides a non aqueous electrolyte secondary battery having excellent fire retardancy.

As a room temperature molten salt to be used in the non aqueous electrolyte for a non aqueous electrolyte secondary battery of the present invention, a quaternary ammonium salt, for example, a trimethylalkyl ammonium salt, and the like, can be used. Specifically, the salt can be at least one salt selected from trimethylpropyl ammonium•trifluoromethanesulfonimide $((CH_3)_3N^+(C_3H_7)N^-(CF_3SO_2)_2)$, trimethyloctyl ammonium•trifluoromethanesulfonimide $((CH_3)_3N^+(C_8H_{17})N^-(CF_3SO_2)_2)$, trimethylallyl ammonium•trifluoromethanesulfonimide $((CH_3)_3N^+(Allyl)N^-(CF_3SO_2)_2)$, trimethylhexyl ammonium•trifluoromethanesulfonimide $((CH_3)_3N^+(C_6H_{13})N^-(CF_3SO_2)_2)$, trimethylethyl ammonium•2,2,2-trifluoro-N-(trifluoro methylsulfonyl)acetamide $((CH_3)_3N^+(C_2H_5)(CF_3CO)N^-(CF_3SO_2))$, trimethylallyl ammonium•2,2,2-trifluoro-N-(trifluoro methylsulfonyl)acetamide $((CH_3)_3N^+(Allyl)(CF_3CO)N^-(CF_3SO_2))$, trimethylpropyl ammonium•2,2,2-trifluoro-N-(trifluoro methylsulfonyl)acetamide $((CH_3)_3N^+(C_3H_7)(CF_3CO)N^-(CF_3SO_2))$, tetraethyl ammonium•2,2,2-trifluoro-N-(trifluoromethylsulfonyl)acetamide $((C_2H_5)_4N^+(CF_3CO)N^-(CF_3SO_2))$ and triethylmethyl ammonium•2,2,2-trifluoro-N-(trifluoro methylsulfonyl)acetamide $((C_2H_5)_3N^+(CH_3)(CF_3CO)N^-(CF_3SO_2))$. Trifluoromethanesulfonimide may also be referred to bis(trifluoromethylsulfonyl)imide.

If a lithium salt is added to the non aqueous electrolyte in addition to the room temperature molten salt described above, lithium ions from the lithium salt are occluded and discharged at the negative electrode.

As a lithium salt mixed with the room temperature molten salt, at least one salt selected from $LiPF_6$, $LiBF_4$, $LiClO_4$, $LiCF_3SO_3$, $LiC_4F_9SO_3$, $LiN(CF_3SO_2)_2$, $LiN(C_2F_5SO_2)_2$, $LiAsF_6$ and $Li(CF_3SO_2)N_2(COCF_3)$ can be used.

When at least a carbonate selected from a chain carbonate and a cyclic carbonate is added to the non aqueous electrolyte in addition to the room temperature molten salt described above, ion conductivity of the non aqueous electrolyte is increased and a highly efficient battery can be provided. However, if an amount of the carbonate is excessive, the non aqueous electrolyte becomes easily decomposed. Therefore, it is preferable that the room temperature molten salt is contained in an amount of 25 volume % or more in the non aqueous electrolyte.

In a non aqueous electrolyte secondary battery of the present invention, as a material for the positive electrode which is capable of occluding and discharging anions, for example, a material containing a conjugated electron cloud is used. As the material containing a conjugated electron cloud, a carbon material such as graphite and a conductive polymer such as polypyrrole, polythiophene, polyaniline can be used. As a positive electrode collector, an aluminum film and a tantalum film that are resistant to high electronic potential can be used.

In a non aqueous electrolyte secondary battery of the present invention, as a material which is capable of occluding and discharging cations, various materials, for example, carbon materials and the like can be used.

When the lithium salt is added to the non aqueous electrolyte so as to have lithium ions as cations occluded and discharged at the negative electrode, graphite and silicon that are of high crystallinity are preferred as a material for the negative electrode to increase the amount of lithium ion that is occluded and discharged and to obtain maximum battery capacity.

As the graphite having high crystallinity, there is a graphite in which the "d" value of 002 plane by X-ray diffraction (interlayer spacing $d_{002}$) is preferably 3.35~3.40 Å. More preferably, graphite having $d_{002}$ of 3.354~3.365 Å should be used. It is preferable to use a graphite having an average particle diameter in a range of 1~30 μm, a specific surface area in a range of 0.5~50 m$^2$/g, and a true density in a range of 1.9~2.3 g/cm$^3$.

If silicon is used as a material for the negative electrode, battery capacity can be increased. Especially, if a material in which copper is diffused in silicon is used, stress during occluding of lithium is reduced and cycle characteristics are improved.

A copper film can be used as a negative electrode collector of the negative electrode. A copper film having a rough surface that is obtained by electrolysis to increase adhesion is preferred.

DESCRIPTION OF PREFERRED EMBODIMENTS

Examples of a non aqueous electrolyte secondary battery of the present invention are described below to show that the battery has a large capacity. It is of course understood that the present invention can be modified within the scope and spirit of the appended claims.

EXAMPLE 1

In this example, a non aqueous electrolyte in which LiN(CF$_3$SO$_2$)$_2$ as a lithium salt was added in an amount of 1 mol/l to trimethyloctyl ammonium.trifluoromethane-sulfonimide ((CH$_3$)$_3$N$^+$(C$_8$H$_{17}$)N$^-$(CF$_3$SO$_2$)$_2$) as a room temperature molten salt was used.

A natural graphite having an average particle diameter of 18 μm, a true density of 2.20 g/cm$^3$, a specific surface area of 6.3 m$^2$/g, $d_{002}$ of 3.35 Å and Lc (size in a direction of the c-axis) of 100 nm was used as a material for a positive electrode that is capable of occluding and discharging anions. Polyfluorovinylidene dissolved in N-methyl-2-pyrrolidone as a binding agent was added to the natural graphite in a ratio of the graphite to polyfluorovinylidene of 85:15 by weight. They were mixed to make a slurry in a mortar. The slurry was coated on an aluminum film, and dried at 110° C. to prepare a positive electrode of 2 cm×2 cm.

As shown in FIG. 1, the non aqueous electrolyte 14 was poured in a test cell container 10, the positive electrode 11 prepared above as a working electrode, a negative electrode 12a as an auxiliary electrode and a reference electrode 13 were also placed in the container to prepare a test cell in Example 1. Lithium metal was used for the negative electrode 12a and the reference electrode 13.

Figure 2:
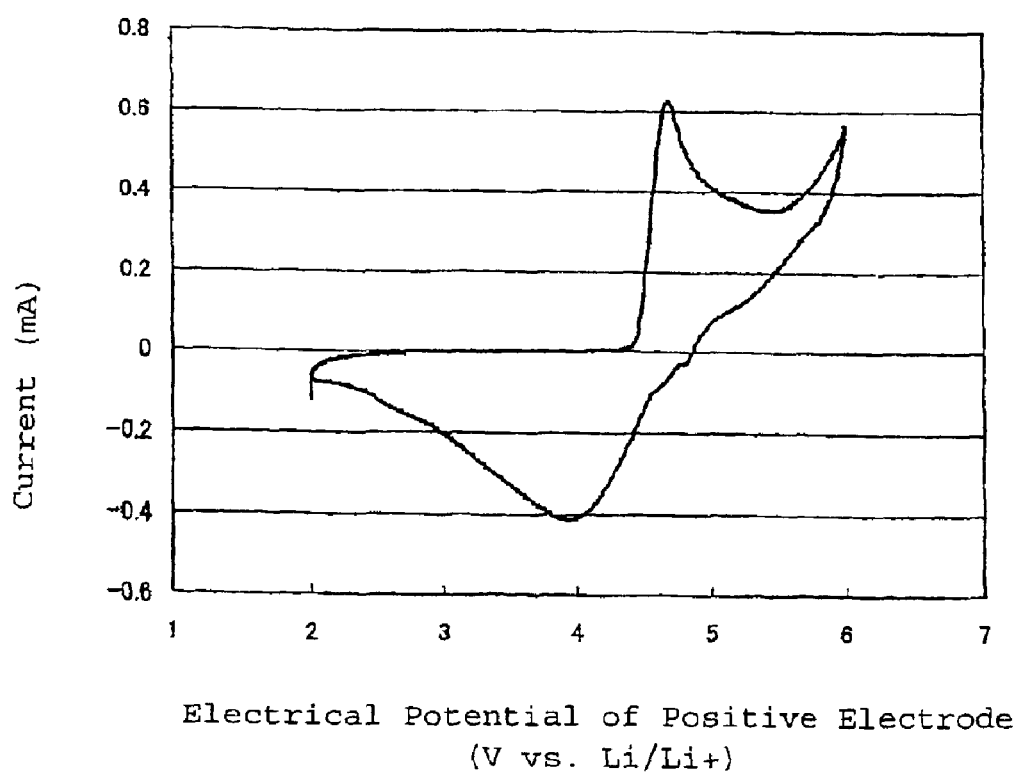
FIG. 2 is a cyclic voltammogram of a positive electrode of the test cell in Example 1 that was obtained by scanning the electrical potential of the positive electrode.

Then the electrical potential of the positive electrode 11 was scanned in a range of 2~6V (vs. Li/Li$^+$) relative to the reference electrode 13, and at a scan rate of 500 μV/s. After scanning from an initial electrical potential of 2.7 V (vs. Li/Li$^+$) of the positive electrode 11 versus the reference electrode 13 in the oxidation direction, the potential was scanned in the reduction direction to obtain a cyclic voltammogram. The results are shown in FIG. 2.

A peak corresponding to occlusion of anions in the natural graphite in the positive electrode during scanning in the oxidation direction was about 4.7 V (vs. Li/Li$^+$). A peak corresponding to discharge of anions from the natural graphite in the positive electrode during scanning in the reduction direction was about 3.9 V (vs. Li/Li$^+$). It is understood that anions were occluded in the natural graphite and were discharged from the natural graphite that was used for the positive electrode.

EXAMPLE 2

In this example, a non aqueous electrolyte in which LiN(CF$_3$SO$_2$)$_2$ as a lithium salt was added in an amount of 1 mol/l to trimethyloctyl ammonium.trifluoromethane-sulfonimide ((CH$_3$)$_3$N$^+$(C$_8$H$_{17}$)N$^-$(CF$_3$SO$_2$)$_2$) as a room temperature molten salt was also used.

To prepare a negative electrode the same natural graphite as used in Example 1 was used as a material that is capable of occluding and discharging cations. Polyfluorovinylidene dissolved in N-methyl-2-pyrrolidone as a binding agent was added to the natural graphite in a ratio of the graphite to polyfluorovinylidene of 85:15 by weight. They were mixed to make a slurry in a mortar. The slurry was coated on a copper film, and dried at 110° C. to prepare a negative electrode of 2 cm×2 cm.

Figure 3:
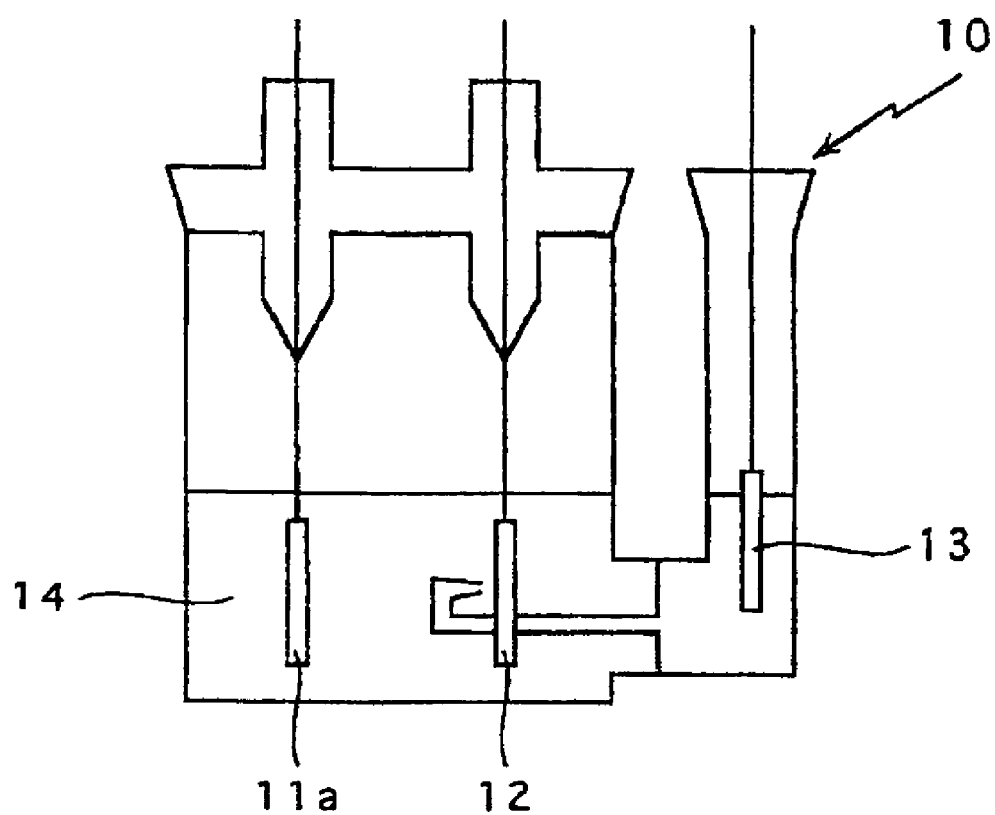
FIG. 3 is a drawing illustrating a test cell prepared in Example 2.

As shown in FIG. 3, the non aqueous electrolyte 14 was poured in a test cell container 10, the negative electrode 12 prepared above as a working electrode, a positive electrode 11a as an auxiliary electrode and a reference electrode 13 were also placed in the container to prepare a test cell in Example 2. Lithium metal was used for the positive electrode 11a and the reference electrode 13.

Figure 4:
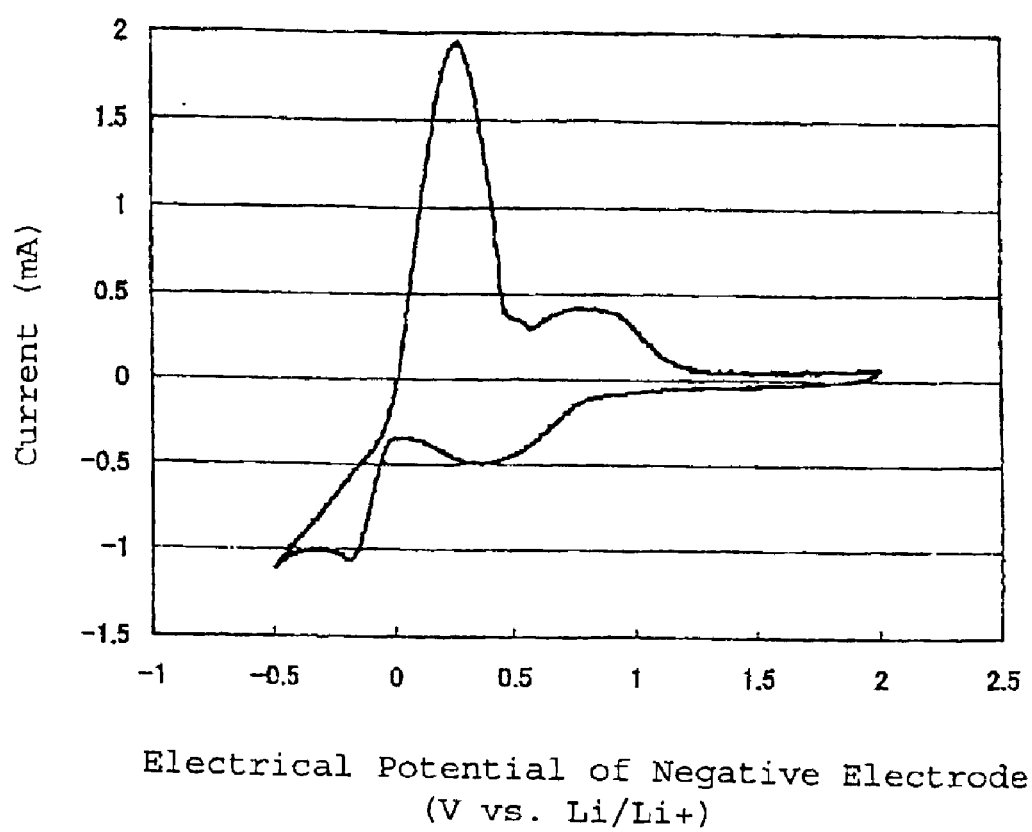
FIG. 4 is a cyclic voltammogram of a negative electrode of the test cell in Example 2 that was obtained by scanning the electrical potential of the negative electrode.

Then the electrical potential of the negative electrode 12 was scanned in a range of −0.5~2 V (vs. Li/Li$^+$) relative to the reference electrode 13, and at a scan rate of 500 μV/s. After scanning from an initial electrical potential of 2 V (vs. Li/Li$^+$) of the negative electrode 12 versus the reference electrode 13 in the reduction direction, the potential was scanned in the oxidation direction to obtain a cyclic voltammogram. The results are shown in FIG. 4.

A peak corresponding to occlusion of cations in the natural graphite in the negative electrode during scanning in the reduction direction was not greater than 1.0 V (vs. Li/Li$^+$). A peak corresponding to discharge of cations from the natural graphite in the negative electrode during scanning in the oxidation direction was not greater than 1.0 V (vs. Li/Li$^+$). It is understood that cations were occluded in the natural graphite and were discharged from the natural graphite that was used for the negative electrode.

According to the results relating to the characteristics of the test cells in Example 1 and Example 2, it is expected that a non aqueous electrolyte secondary battery having a battery voltage of about 3.6 V can be prepared from a combination of the positive electrode 11 in Example 1 and the negative electrode 12 in Example 2.

EXAMPLE 3

In this example, a non aqueous electrolyte in which LiN(CF$_3$SO$_2$)$_2$ as a lithium salt was added in an amount of 1 mol/l to trimethyloctyl ammonium.trifluoromethanesulfonimide ((CH$_3$)$_3$N$^+$(C$_8$H$_{17}$)N$^-$(CF$_3$SO$_2$)$_2$) as a room temperature molten salt was also used.

Silicon was used as a material for a negative electrode that is capable of occluding and discharging cations to prepare a negative electrode. An amorphous silicon coating was formed by sputtering on the surface of a copper film, which surface was treated by electrolysis, to prepare the negative electrode of 2 cm×2 cm.

As shown in FIG. 3, a test cell was prepared in the same manner as Example 2 except that the negative electrode was prepared above was used. The non aqueous electrolyte 14 was poured in a test cell container 10, the negative electrode 12 prepared above was used as a working electrode. Lithium metal was used for the positive electrode 11a and for the reference electrode 13.

Figure 5:
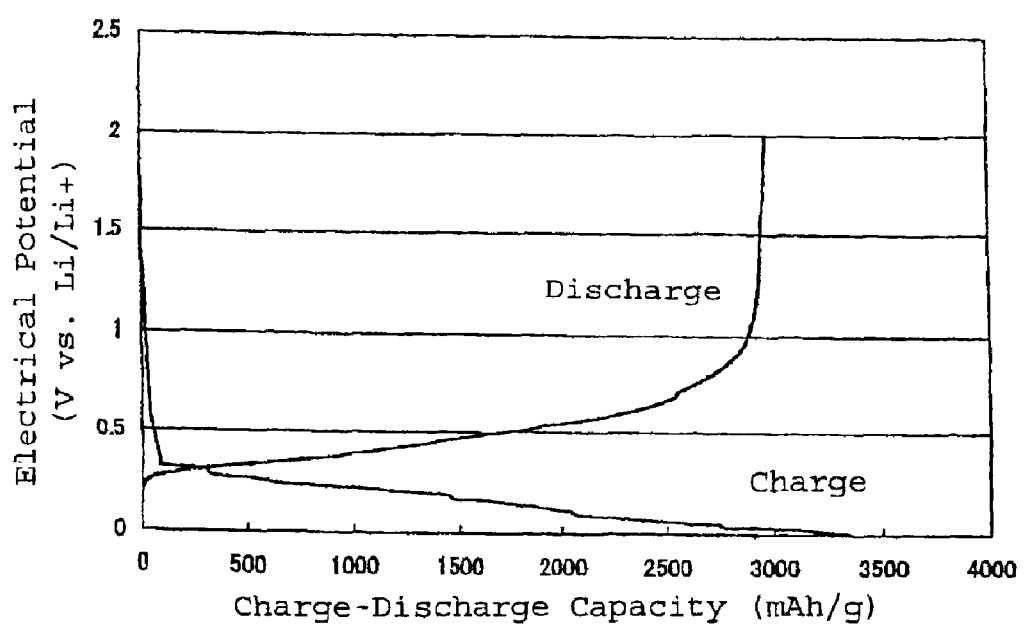
FIG. 5 is a graph showing a relationship of electrical potential and capacity relative to a reference electrode of the negative electrode at the initial charge and discharge when the test cell prepared in Example 3 was charged and discharged.

The test cell was charged at a current density of 0.025 mA/cm$^2$ until an electrical potential of the negative electrode 12 relative to the reference electrode 13 reached 0.0 V (vs. Li/Li$^+$), and then the test cell was discharged to an electrical potential of the negative electrode 12 relative to the reference electrode 13 of 2.0 V (vs. Li/Li$^+$). A relationship between electrical potential and capacity of the negative electrode 12 at the initial charging and discharging was studied. The results are shown in FIG. 5.

In this test cell, the initial charge capacity of the negative electrode 12 was 3346 mAh/g, the initial discharge capacity was 2976 mAh/g which are close to the theoretical capacity of 4200 mAh/g. The charge and discharge were conducted at high capacity.

LiN(CF$_3$SO$_2$)$_2$ as a lithium salt was dissolved in an amount of 1 mol/l in a solvent of a mixture of a trimethyloctyl ammoniumtrifluoromethanesulfonimide ((CH$_3$)$_3$N$^+$(C$_8$H$_{17}$)N$^-$(CF$_3$SO$_2$)$_2$) as the room temperature molten salt that was used in Examples 1~3 and diethyl carbonate in a ratio shown below in Table 1 to prepare a non aqueous electrolyte.

Electrolytic conductivity (mS/cm) of each non aqueous electrolyte prepared above was measured and the results are shown in Table 1. Trimethyloctyl ammonium.trifluoromethanesulfonimide ((CH$_3$)$_3$N$^+$(C$_8$H$_{17}$)N$^-$(CF$_3$SO$_2$)$_2$) is referred to as TMOA-TFSI, and diethyl carbonate is referred to as DEC in Table 1.

TABLE 1

| Temperature | Electrolytic Conductivity (mS/cm) TMOA - TFSI:DEC (by volume) | | | | |
|---|---|---|---|---|---|
| (° C.) | 100:0 | 75:25 | 50:50 | 25:75 | 0:100 |
| −20 | 0.00014 | 0.0109 | 0.206 | 0.839 | 1.04 |
| 0 | 0.00345 | 0.0745 | 0.622 | 1.624 | 1.575 |
| 25 | 0.0475 | 0.382 | 1.593 | 2.90 | 2.26 |
| 45 | 0.203 | 0.953 | 2.76 | 4.08 | 2.79 |
| 60 | 0.477 | 1.643 | 3.83 | 5.03 | 3.20 |

From the results, when the solvent in which diethyl carbonate was added to trimethyloctyl ammonium.trifluoromethanesulfonimide ((CH$_3$)$_3$N$^+$(C$_8$H$_{17}$)N$^-$(CF$_3$SO$_2$)$_2$) was used, electrolytic conductivity of the non aqueous electrolyte was increased. Especially, when the solvent containing diethyl carbonate in an amount of 50~75 volume % was used, electrolytic conductivity of the non aqueous electrolyte was significantly increased. However, if diethyl carbonate is added excessively, the non aqueous electrolyte is easily decomposed. Therefore, it is preferable that the non aqueous electrolyte includes a room temperature molten salt in an amount of 25 volume % or more.

ADVANTAGES OF THE INVENTION

As described above in detail, a non aqueous electrolyte secondary battery of the present invention comprises a positive electrode made from a material which is capable of occluding and discharging anions, a negative electrode made from a material which is capable of occluding and discharging cations, and a non aqueous electrolyte containing a room temperature molten salt having a melting point of not greater than 60° C. In the non aqueous electrolyte secondary battery of the present invention, anions are occluded and discharged in the positive electrode and cations are occluded and discharged in the negative electrode to charge and discharge the battery. The present invention provides a non aqueous electrolyte secondary battery having excellent fire retardancy.

Even if an electrical potential of the battery becomes high, decomposition of the non aqueous electrolyte will not occur as occurs with a conventional non aqueous electrolyte using an organic solvent because the non aqueous electrolyte secondary battery of the present invention uses a non aqueous electrolyte containing a room temperature molten salt having a melting point of not greater than 60° C. The non aqueous electrolyte secondary battery of the present invention has less loss of capacity than the conventional battery.

What is claimed is:

1. A non aqueous electrolyte secondary battery comprising a positive electrode made from a material which occludes and discharges anions, a negative electrode made from a material which occludes and discharges cations, and a non aqueous electrolyte containing a room temperature molten salt having a melting point of not greater than 60° C. and including an anion containing nitrogen.

2. The non aqueous electrolyte secondary battery according to claim 1, wherein said material which occludes and discharges anions is a material containing a conjugated electron cloud.

3. The non aqueous electrolyte secondary battery according to claim 2, wherein said material which occludes and discharges anions is graphite.

4. The non aqueous electrolyte secondary battery according to claim 1, wherein said material which occludes and discharges cations is graphite.

5. The non aqueous electrolyte secondary battery according to claim 1, wherein said material which occludes and discharges cations is silicon.

6. The non aqueous electrolyte secondary battery according to claim 1, wherein said room temperature molten salt is a quaternary ammonium salt.

7. The non aqueous electrolyte secondary battery according to claim 6, wherein said quaternary ammonium salt is at least one salt selected from the group consisting of trimethylpropyl ammonium.trifluoromethanesulfonimide $((CH_3)_3N^+(C_3H_7)N^-(CF^3SO^2)_2)$, trimethyloctyl ammonium.trifluoromethanesulfonimide $((CH_3)_3N^+(C_8H_{17})N^-(CF_3SO_2)_2)$, trimethylallyl ammonium.trifluoromethanesulfonimide $((CH_3)_3N^+(Allyl)N^-(CF_3SO_2)_2)$, trimethylhexyl ammonium.trifluoromethanesulfonimide $((CH_3)_3N^+(C_6H_{13})N^-(CF_3SO_2)_2)$, trimethylethyl ammonium.2,2,2-trifluoro-N-(trifluoro methylsulfonyl)acetamide $((CH_3)_3N^+(C_2H_5)(CF_3CO)N^-(CF_3SO_2))$, trimethylallyl ammonium.2,2,2-trifluoro-N-(trifluoro methylsulfonyl)acetamide $((CH_3)_3N^+(Allyl)(CF_3CO)N^-(CF_3SO_2))$, trimethylpropyl ammonium.2,2,2-trifluoro-N-(trifluoro methylsulfonyl)acetamide $((CH_3)_3N^+(C_3H_7)(CF_3CO)N^-(CF_3SO_2))$, tetraethyl ammonium.2,2,2-trifluoro-N-(trifluoromethylsulfonyl)acetamide $((C_2H_5)_4N^+(CF_3CO)N^-(CF_3SO_2))$ and triethylmethyl ammonium.2,2,2-trifluoro-N-(trifluoromethylsulfonyl)acetamide $((C_2H_5)_3N^+(CH_3)(CF_3CO)N^-(CF_3SO_2))$.

8. The non aqueous electrolyte secondary battery according to claim 1, wherein said non aqueous electrolyte further contains a lithium salt.

9. The non aqueous electrolyte secondary battery according to claim 8, wherein said lithium salt is at least one salt selected from the group consisting of $LiPF_6$, $LiBF_4$, $LiClO_4$, $LiCF_3SO_3$, $LiC_4F_9SO_3$, $LiN(CF_3SO_2)_2$, $LiN(C_2F_5SO_2)_2$, $LiAsF_6$ and $Li(CF_3SO_2)N_2(COCF_3)$.

10. The non aqueous electrolyte secondary battery according to claim 1, wherein said non aqueous electrolyte further contains at least one carbonate selected from the group consisting of a chain carbonate and a cyclic carbonate.

11. The non aqueous electrolyte secondary battery according to claim 1, wherein said room temperature molten salt is contained in an amount of 25 volume % or more in said non aqueous electrolyte.

12. The non aqueous electrolyte secondary battery according to claim 7, wherein said quaternary ammonium salt is trimethyloctyl ammonium.trifluoromethanesulfonimide $((CH_3)_3N^+(C_8H_{17})N^-(CF_3SO_2)_2)$.

13. The non aqueous electrolyte secondary battery according to claim 9, wherein said lithium salt is LiN$(CF_3SO_2)_2$.

14. The non aqueous electrolyte secondary battery according to claim 10, wherein said chain carbonate is diethyl carbonate.

15. The non aqueous electrolyte secondary battery according to claim 12, wherein said non aqueous electrolyte further contains a lithium salt.

16. The non aqueous electrolyte secondary battery according to claim 15, wherein said lithium salt is LiN$(CF_3SO_2)_2$.

17. The non aqueous electrolyte secondary battery according to claim 16, wherein said non aqueous electrolyte further contains at least one carbonate selected from the group consisting of a chain carbonate and a cyclic carbonate.

18. The non aqueous electrolyte secondary battery according to claim 17, wherein said chain carbonate is diethyl carbonate.

* * * * *